United States Patent [19]

Santangeli

[11] Patent Number: 5,999,195
[45] Date of Patent: Dec. 7, 1999

[54] AUTOMATIC GENERATION OF TRANSITIONS BETWEEN MOTION CYCLES IN AN ANIMATION

[75] Inventor: Peter Santangeli, Toronto, Canada

[73] Assignee: Silicon Graphics, Inc., Mountain View, Calif.

[21] Appl. No.: 08/829,508

[22] Filed: Mar. 28, 1997

[51] Int. Cl.⁶ .................................................. G06T 13/00
[52] U.S. Cl. ........................................... 345/473; 345/328
[58] Field of Search .................................. 345/473–475, 345/328, 522, 523, 949

[56] References Cited

U.S. PATENT DOCUMENTS 5,692,117  11/1997  Berend et al. ........................... 345/475

OTHER PUBLICATIONS

Hodgins, Jessica K, Paula K. Sweeny and David G. Lawrence, "Generating Natural–Looking Motion for Computer Animation", *Proceedings of Graphic Interface '92*, May 1992, pp. 265–272.

van de Panne, Michiel, Ryan Kim and Eugene Fiume, "Synthesizing Parameterized Motions", *Fifth Eurographics Workshop on Animation and Simulation*, Sep. 17–18, 1994, pp. 1–14.

van de Panne, Michiel, Ryan Kim and Eugene Fiume, "Virtual Wind–up Toys for Animation", *Proceedings of Graphics Interface '84*, May 1994.

*Primary Examiner*—Mark R. Powell
*Assistant Examiner*—Thu Nguyen
*Attorney, Agent, or Firm*—Fish & Richardson P.C.

[57] ABSTRACT

A method for creating an animation tool, and the resulting animation tool, providing transition sequences for a character in an animation from a source frame of a first sequence of frames to a destination frame of a second sequence of frames.

34 Claims, 5 Drawing Sheets

AUTOMATIC GENERATION OF TRANSITIONS BETWEEN MOTION CYCLES IN AN ANIMATION

BACKGROUND

This invention relates to computer animation.

Computer animation can generally be thought of as a sequence of frames, each including data describing the visual content of the frame. Running a frame sequence outputs individual frames, and the changing data in the sequentially output frames convey the temporal changes in the animation.

A character is an animated entity in the animation and is generally represented by a geometric model defined in a format used in an animation platform such as the PowerAnimator™ platform developed by Silicon Graphics, Inc. When such a character appears in an animation frame sequence, the data for each of those frames includes data describing the position of the character's geometric model. When the character moves in that frame sequence, the data of the corresponding frames reflect the changing position of the character.

Figures 1A, 1B:
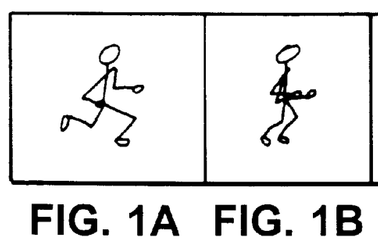
FIGS. 1a–1d show a frame sequence illustrating character positions in a run cycle.
Figure 1C:
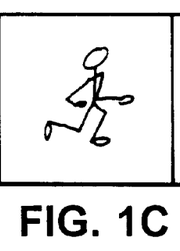
Figure 1D:
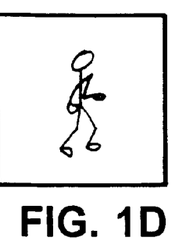

Typically, a character performs several basic motions repeatedly, some of which can be animated with motion "cycles". A motion cycle includes data for a character in a sequence of frames, moving it through a cyclic motion such that repeating the cycle frame sequence produces the effect of continuous motion. For example, a run cycle of a particular character, such as that shown in FIG. 1, may include data for a first frame, positioning the character in a first position, followed by a sequence of frames moving the character through a left step, and a right step, and ending with a frame positioning the character such that it can return to the position of the first frame of the cycle. Repeating the cycle produces the effect of the character's continuous running motion. FIG. 3 shows another illustration of a cycle, this one showing the character performing a jumping motion.

Once created and saved, data for frames of a character's motion cycle can be used each time the character performs that motion, avoiding the need to regenerate the data.

Figures 2A, 2B:
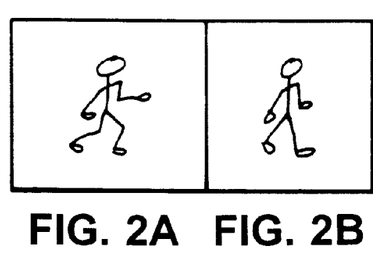
FIGS. 2a–2d show a frame sequence illustrating character positions in a run-to-jump transition.
Figure 2C:
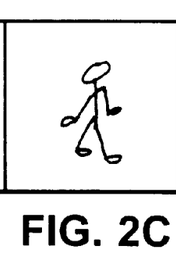
Figure 2D:
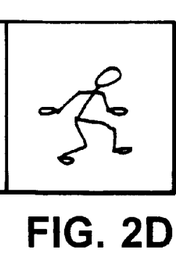
Figure 3A:
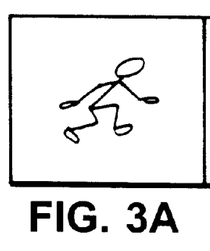
FIGS. 3a–3e show a frame sequence illustrating character positions in a jump cycle.
Figure 3B:
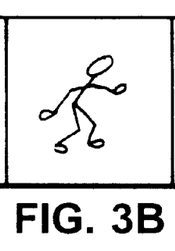
Figure 3C:
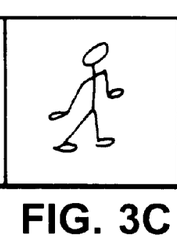
Figure 3D:
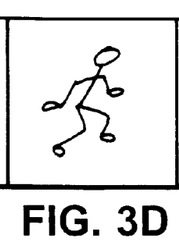
Figure 3E:
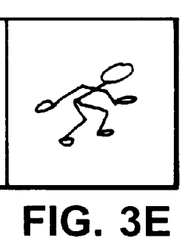
Figure 4A:
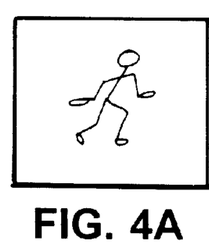
FIGS. 4a–4d show a frame sequence illustrating character positions in a jump-to-run transition.
Figure 4B:
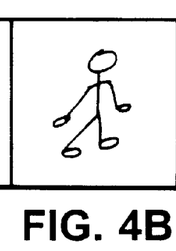
Figure 4C:
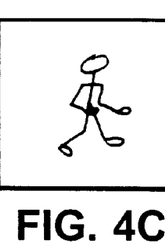
Figure 4D:
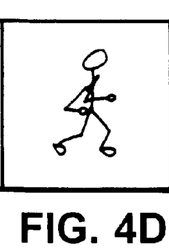

A "transition" includes data describing the position of the character in a sequence of frames as it moves from one cycle to another cycle. FIG. 2 shows a frame sequence illustrating a transition from the run cycle of FIG. 1 to the jump cycle of FIG. 3. FIG. 4 shows a frame sequence illustrating a transition from the jump cycle of FIG. 3 to the run cycle of FIG. 1.

An alternative approach for transitions uses a neutral position through which a character moves as it transitions from a first cycle to a second cycle. Thus, the transition from the first cycle to the second cycle can be broken down into two component transition: a first transition moves the character from the first cycle to the neutral position, and a second transition moves the character from the neutral position to the second cycle. In the examples illustrated in FIGS. 1–4, for example, the neutral position may be the standing position illustrated in FIGS. 2c and 4b. Thus, the Run→Jump transition could be broken down into a Run→Neutral transition, including the character positions illustrated in frames 2a and 2b, and a Neutral→Jump transition, including the character position illustrated in frame 2d. Similarly, the Jump→Run transition could be broken down into a Jump→Neutral transition including the character position illustrated in frame 4a, and a Neutral→Run transition including the character positions illustrated in frames 4c and 4d.

Using approaches such as these, a transition moves a character sequentially from its position in the last frame of a first cycle to its position in the first frame of a second cycle. Thus, when a character transitions from the first cycle to the second cycle, it must move through the first cycle to the position of its last frame before starting the transition, and must begin at the position of the first frame of the second cycle. Further, because a transition depends on knowing the last frame of the first cycle and the first frame of the second cycle, if either of these frames change, the transition frame sequence may need to be updated.

SUMMARY

In general, in one aspect, the invention features a method for a processor to create a transition sequence for a character in an animation from a first sequence of frames to a second sequence of frames. The method comprises selecting as a source frame, a frame of the first sequence, selecting as a destination frame, a frame of the second sequence, and automatically generating a transition sequence from the source frame to the destination frame.

Certain implementations of the invention may include one or more of the following features.

The method selects as a second source frame, a frame of the first sequence and as a second destination frame, a frame of the second sequence, and automatically generates a second transition sequence from the second source frame to the second destination frame, wherein the pair of second source and second destination frames differs from the pair of source and destination frames.

The method determines at least one of the source and destination frames based on user input.

The method generates the transition sequence in response to user input.

The method generates the transition sequence using interpolation between the source frame and the destination frame.

The method generates the transition sequence using inverse kinematics based on a definition of the character.

The method provides previewing the automatically generated transition sequence.

The method provides editing the automatically generated transition sequence in response to user input.

The method displays graphical representations of the first and second sequences of frames, and, in response to user input, displays a graphical representation of a transition from the first sequence to the second sequence, wherein the automatically generated transition sequence corresponds to the transition represented by the graphical representation displayed in response to user input.

In general, in another aspect, the invention enables use of the computer-implemented method through a memory device storing computer-readable instructions for aiding the computer to create transitions for a character in an animation from a first sequence of frames to a second sequence of frames.

In another aspect, the invention features an animation system including a monitor, for displaying graphical representations of at least two sequences of frames for a character in an animation, at least one user input device, for allowing a user to input commands based on the monitor display for creating a transition from a first sequence to a second sequence, and a processor, for generating a transition sequence from a source frame from the first sequence to a destination frame from the second sequence, where the source frame is selected from the first sequence and the destination frame is selected from the second sequence.

Certain implementations of the invention may include one or more of the following features.

The processor of the animation system automatically generates an additional transition sequence from the first sequence to the second sequence, wherein the additional transition sequence has a different pair of source and destination frames.

The processor of the animation system determines the source and destination frames based on user input received from a user input device.

The processor of the animation system generates the transition sequence in response to user input received from a user input device.

The processor of the animation system generates the transition sequence using interpolation between the source frame and the destination frame.

The processor of the animation system generates the transition sequence using inverse kinematics based on a definition of the character.

The processor of the animation system displays a preview of the generated transition sequence on the monitor.

The processor of the animation system edits the generated transition sequence in response to user input received from a user input device.

In another aspect, the invention features a memory device storing computer-readable instructions for animating a character. The memory device stores instructions defining a plurality of sequences of frames for a character in an animation and instructions defining a transition sequence from a source frame of the first sequence to a destination frame of the second sequence, where the source frame is selected from the first sequence and the destination frame is selected from the second sequence.

Certain implementations of the invention may include one or more of the following features.

The memory device further includes instructions defining an additional transition sequence from the first sequence to the second sequence, wherein the additional transition sequence has a different pair of source and destination frames.

The instructions defining the transition sequence are based on interpolation between the source frame and the destination frame.

The instructions defining the transition sequence are based on inverse kinematics, using a definition of the character.

Among the advantages of the invention are one or more of the following. The invention enables transitions to be created and stored between many combinations of animation cycles, and can automatically update each transition when modifications are made to either of its associated animation cycles. By enabling creation of transitions for a character from its position in an arbitrary frame of a first cycle to its position in an arbitrary frame of ta second cycle, the invention provides flexibility in creating animation sequences. Further, in interactive applications such as video games, enabling transitions from positions of intermediate frames of the first cycle reduces the delay between a user's inputting a command for a character to move from the first cycle and the displaying to the user of the character moving from the first cycle, because the character need not complete the entire first cycle to reach the position of the last frame before beginning the transition.

Other advantages and features will become apparent from the following description and from the claims.

DESCRIPTION

Figure 5:
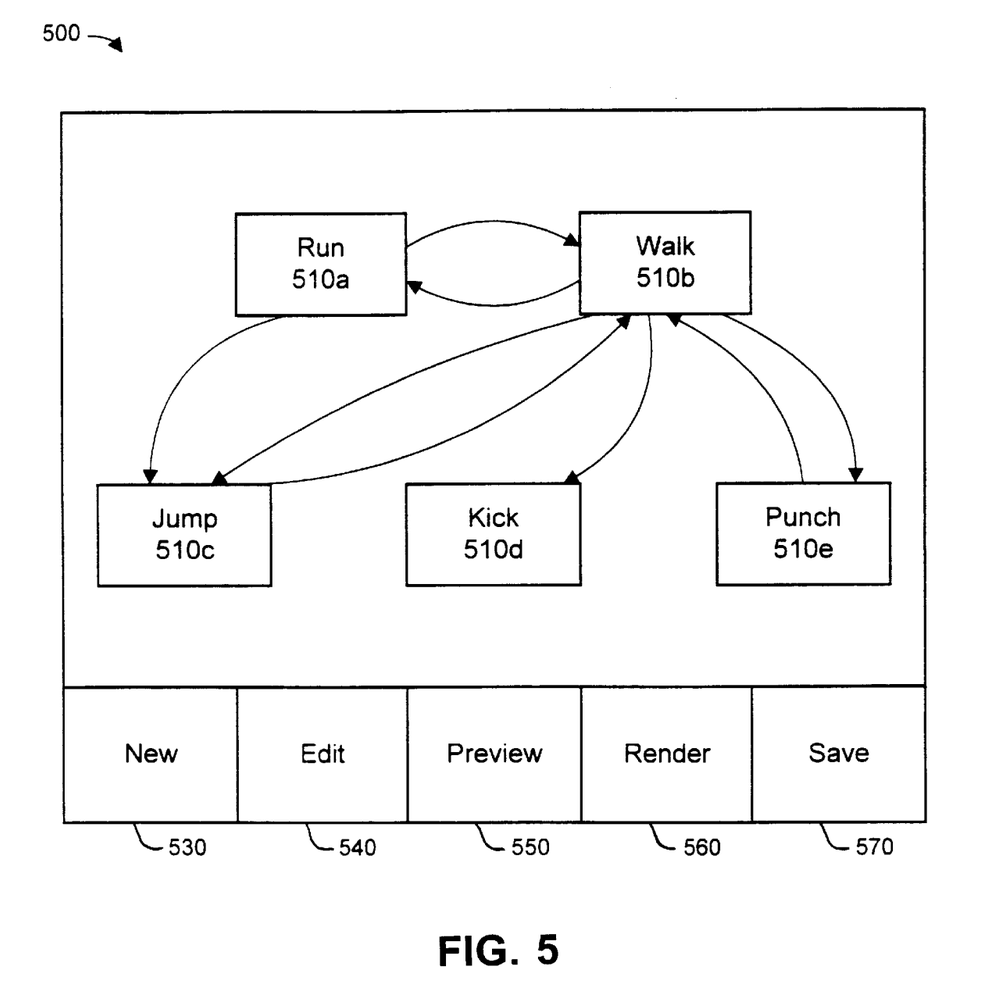
FIG. 5 shows a graphical user interface.

FIG. 5 shows a window 500 of a graphical user interface of an animation system. Window 500 displays graphical representations of motion cycles 510a–510e and transitions 520 between pairs of motion cycles for a character in an animation.

Various methods can be used to create and store character data for frame sequences of cycles such as cycles 510a–510e, such that the data is accessible by the animation system. For example, an application such as PowerAnimator™ can generate character data for each frame in a frame sequence of a motion cycle and store the data in a computer-readable memory as a motion cycle file. Alternatively, the character data for a frame sequence may be automatically generated by, for example, inputting data for the desired positions of the character in the first and last frames of the frame sequence and using conventional techniques such as interpolation to generate character data for the intermediate frames. Generally, the motion cycle file will be stored such that an application accessing the file can determine information such as the number of frames in the cycle and the character data in any specified frame of the cycle.

Figure 6:
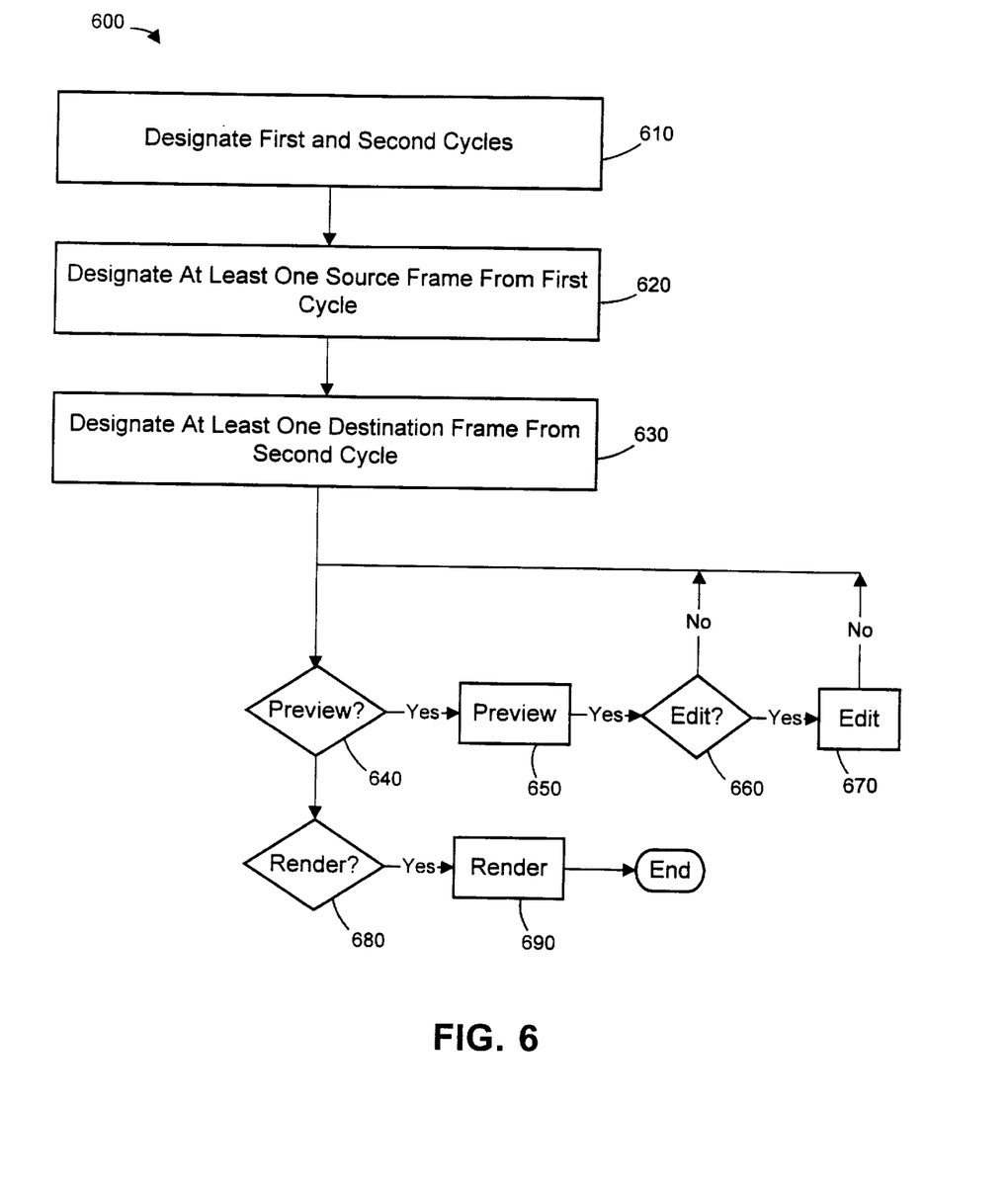
FIG. 6 is a flow diagram for creating a transition.
Figure 7:
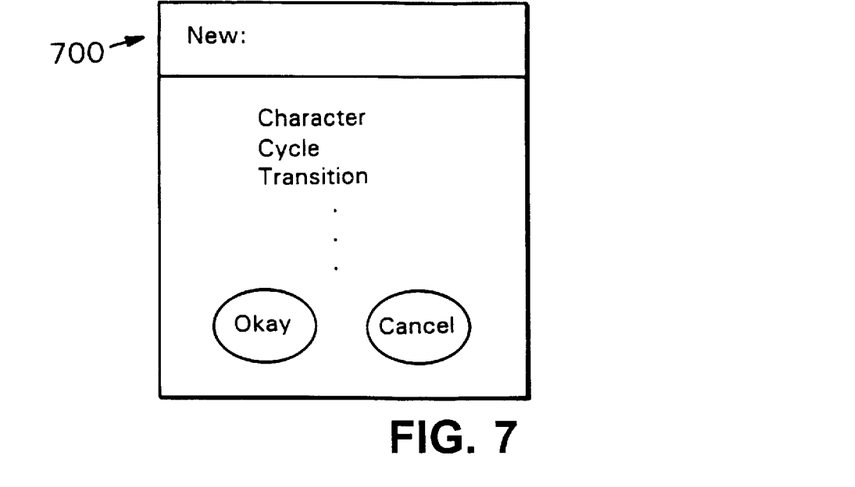
FIG. 7 shows a menu.

As shown in FIG. 6, a user creates a transition by first, designating a first cycle and a second cycle (step 610) for a character. For example, using an input device such as a mouse, a user selects "New" 530 (FIG. 5), which brings up menu table 700 (FIG. 7). The user then selects "Transition", which brings up a dialog box 800 (FIG. 8) that includes fields for the user to input names of the first and second cycles.

A user designates a frame from the first cycle as a source frame (step 620), and a frame from the second cycle as a destination frame (step 630). The source frame is a frame selected from the first cycle to precede the first frame of the transition frame sequence; the destination frame is a frame selected from the second cycle to follow the last frame of the transition frame sequence.

Figure 9:
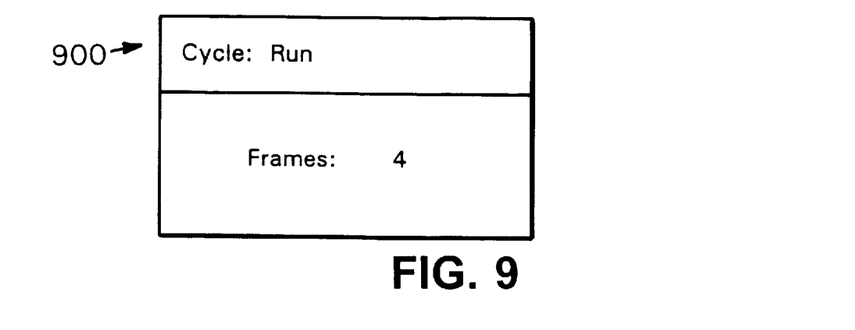
FIG. 9 shows a dialog box for a cycle.

A user interface may be provided for showing the number of frames in a motion cycle, and allowing the user to designate a frame by its frame number. For example, using the user interface of FIG. 5, when a user clicks on a motion cycle such as 510a, a dialog box 900 such as that illustrated in FIG. 9 can be displayed to inform the user of the number of frames in that motion cycle.

Figure 8:
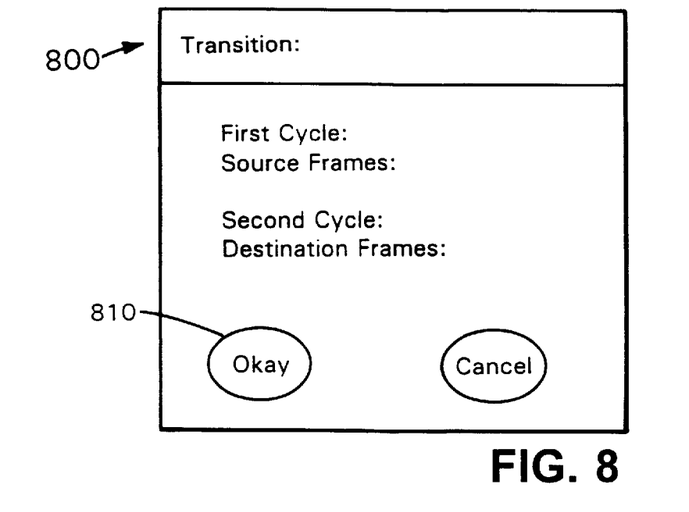
FIG. 8 shows a dialog box for creating a transition.

The user can then designate a source and destination frame by frame number in transition dialog box 800, illustrated in FIG. 8. Optionally, the user may designate multiple frames from the first cycle as source frames and/or multiple frames from the second cycle as destination frames, to create multiple transition frame sequences between respective pairs of source frames and destination frames. In addition, default parameters may be provided for the source and destination frames. For example, a possible default parameter may be set to create transition frame sequences for a transition from each frame of the first cycle to the first frame of the second cycle.

Because a transition from a first cycle to a second cycle may include data describing multiple frame sequences, each having a different pair of source and destination frames, a transition may more accurately be described as a transition suite.

Using the user interface 500, 800 (FIGS. 5 and 8), after making the designations (or allowing default parameters to be used), the user selects the "okay" option (810) in transition dialog box 800 to save the transition suite.

The data for the frame sequences for the transition suite need not be generated at the time the transition suite is created or saved. Especially for a transition suite having multiple transition frame sequences, generating the transition frame sequences can take considerable time, processing power, and memory. Accordingly, when a user selects okay, a transition file for storing character data corresponding to the transition suite may be created, and information such as the locations of source and destination frames of specified motion cycles may be saved, but the actual character data for the frames of the transition frame sequences need not be generated until a user inputs a specific command to do so.

The transition dialog box 800 disappears from the window 500 after the transition suite is saved, and an arc between the graphical representations of the first and second cycles, such as those 520 illustrated in FIG. 5, appears in the user interface 500 to represent the newly created transition suite.

A user may optionally preview transition frame sequences (step 640 of FIG. 6). By selecting the preview option 550 in the menu bar of the user interface 500 (FIG. 5), a new window appears in the user interface 500, within which the frame sequence may be run. Once the preview information is entered, the animation system generates the data for the transition frame sequences to be previewed, if the data is not yet generated.

The data generated for a transition file, like a motion cycle file, includes data for frame sequences. The transition file will include, for example, individually identifiable transitions, including their source and destination frames, as well as the character data for the frame sequences of each frame of each transition. As discussed above, each transition in the transition suite includes data for character positions for frame sequences to follow designated source frames and to precede designated destination frames. The transition frame sequence data may be generated by, for example, a linear interpolation method between the character positions in the source frame and the destination frame. Other forms of interpolation including higher order interpolation methods such as splining may also be used. Additionally, inverse kinematics may be used in conjunction with the interpolation to ensure that the interpolated positions for the character are valid positions, based on the predefined geometry of the character.

Once the frame sequence data to be previewed has been generated, the frame sequences are run in the preview window (step 650 in FIG. 6). The user may edit the transition frame sequences (steps 660, 670). As shown in the menu bar of FIG. 5, appropriate menu options such as the "edit" option 540 can be provided to allow a user to open an animation application for editing specified frame sequences.

For example, an editing tool can be provided to allow a user to edit the data in a transition suite by responding to a user's clicking on the graphical representation of the transition suite. The tool then accesses data in the corresponding transition file, and enables the user to view and edit the character positions defined by the frame data for a specified transition.

A user may continue to preview frame sequences, or may select the "Render" option 560 in the menu bar of FIG. 5 to create raster images for frames from character data. In response, the animation system generates and stores all frame sequences for the transition suite as needed into appropriate image data files for display (steps 680, 690).

Various alternatives may be provided for updating a transition from a first motion cycle to a second motion cycle, should the data for corresponding frame sequences change. One alternative is to automatically update transitions when one of their motion cycles is altered by determining a correspondence between the original and altered frames of the altered motion cycle. The expense of such updating will vary with factors such as whether the transition frame sequences have been rendered. Another alternative is to display an appropriate warning or error message.

A database can be created that references the character data files for the rendered cycles and transition suites. Such a database can be used for creating animation. For example, interactive video game platforms can access such a character database to provide the interactive animation used in video games.

This transition generating system has other applications. The transition suites created can be used as an animation tool in creating animated movies. By enabling transition suites to be created using arbitrary frames of the first cycle as the source frame and the second cycle as the destination frame, an animator has great flexibility in determining when a transition should occur.

While the invention has been described in terms of a software implementation, the invention may be implemented in hardware or software, or a combination of both. Preferably, the invention is implemented in a software program executing in an animation system. Such an animation system may include a processor, a data storage system, at least one input device, and an output device.

Figure 10:
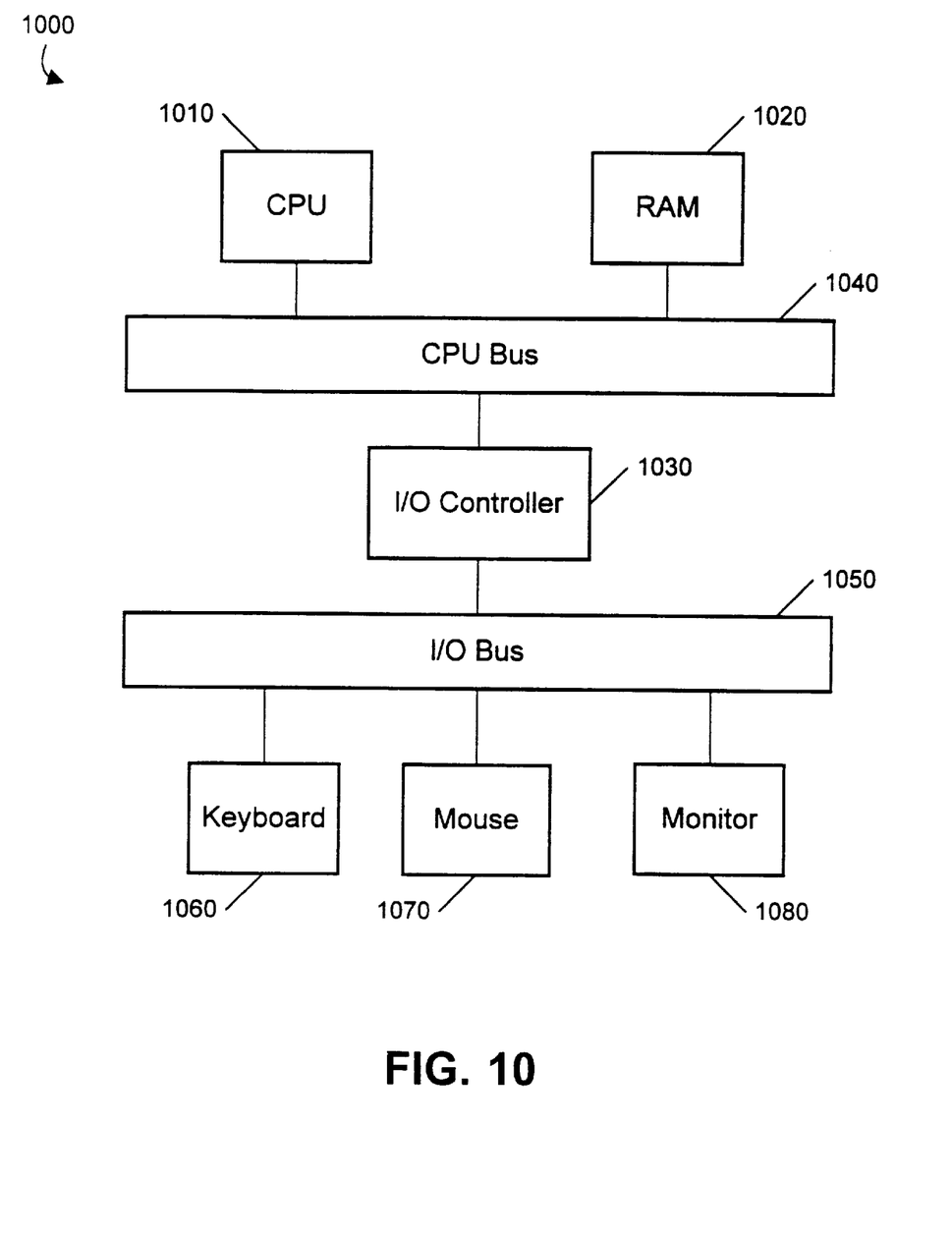
FIG. 10 shows an animation system.

FIG. 10 illustrates one such animation system 1000, including a CPU 1010, a RAM 1020, and an I/O controller 1030 coupled by a CPU bus 1040. The I/O controller 1030 is also coupled by an I/O bus 1050 to input devices such as a keyboard 1060 and a mouse 1070, and output devices such as a monitor 1080.

Other embodiments are within the scope of the following claims. For example, the user interface 500 may use a variety of graphical representations. The transition dialog box 800 (FIG. 8) may provide a list of all defined cycles for the character, from which the user can select the first and second cycles. User input may be generated for various functions using a variety of input devices, including a mouse, a joystick, a digitized coordinate pen, and keyboard keys. For example, to create a new transition suite, the user interface may provide "click-and-drag" options to allow the user to click on the first cycle and drag it over the second cycle.

What is claimed is:

1. A method for creating an animation transition sequence from a first sequence of frames to a second sequence of frames, the method comprising:

permitting selection as a source frame any frame from the first sequence of frames;

permitting selection as a destination frame any frame from the second sequence of frames; and automatically generating a transition sequence from the selected source frame to the selected destination frame.

2. The method of claim 1, further comprising:

permitting selection as a second source frame any frame from the first sequence of frames;

permitting selection as a second destination frame any frame from the second sequence of frames; and automatically generating a second transition sequence from the second selected source frame to the second selected destination frame, wherein the pair of second source and second destination frames differs from the pair of source and destination frames.

3. The method of claim 1, wherein user input determines at least one of the source and destination frames.

4. The method of claim 1, wherein the transition sequence is generated in response to user input.

5. The method of claim 1, wherein the transition sequence is generated using interpolation between the source frame and the destination frame.

6. The method of claim 1, wherein the transition sequence is generated using inverse kinematics based on a definition of a character in an animation.

7. The method of claim 1, further comprising previewing the automatically generated transition sequence.

8. The method of claim 1, further comprising editing the automatically generated transition sequence in response to user input.

9. The method of claim 1, further comprising:

displaying graphical representations of the first and second sequences of frames; and displaying, in response to user input, a graphical representation of a transition from the first sequence to the second sequence, wherein the automatically generated transition sequence corresponds to the transition represented by the graphical representation displayed in response to user input.

10. A memory device storing computer-readable instructions for use in an animation system to create animation transitions from a first sequence of frames to a second sequence of frames, the instructions comprising:

instructions for selecting as a source frame any frame from the first sequence of frames;

instructions for selecting as a destination frame any frame from the second sequence of frames; and instructions for automatically generating a transition sequence from the selected source frame to the selected destination frame.

11. An animation system comprising:

a monitor, for displaying graphical representations of at least two sequences of frames for a character in an animation;

at least one user input device, for allowing a user to input commands based on the monitor display for creating a transition from a first sequence of frames to a second sequence of frames; and a processor, for generating an animation transition sequence from a source frame from the first sequence to a destination frame from the second sequence, wherein the source frame is selected from any frame of the first sequence of frames and the destination frame is selected from any frame of the second sequence of frames.

12. The animation system of claim 11, wherein the processor automatically generates an additional transition sequence from the first sequence to the second sequence, wherein the additional transition sequence has a different pair of source and destination frames.

13. The animation system of claim 11, wherein user input received from a user input device determines the source and destination frames.

14. The animation system of claim 11, wherein the processor generates the transition sequence in response to user input received from a user input device.

15. The animation system of claim 11, wherein the processor generates the transition sequence using interpolation between the source frame and the destination frame.

16. The animation system of claim 11, wherein the processor generates the transition sequence using inverse kinematics based on a definition of the character.

17. The animation system of claim 11, wherein the processor displays a preview of the generated transition sequence on the monitor.

18. The animation system of claim 11, wherein the processor edits the generated transition sequence in response to user input received from a user input device.

19. A memory device storing computer-readable instructions for animating a character, comprising:

instructions defining a plurality of sequences of frames for a character in an animation;

instructions defining an animation transition sequence from a source frame of the first sequence of frames to a destination frame of the second sequence of frames, wherein the source frame is selected from any frame of the first sequence of frames and the destination frame is selected from any frame of the second sequence of frames.

20. The memory device of claim 19, further comprising instructions defining an additional transition sequence from the first sequence to the second sequence, wherein the additional transition sequence has a different pair of source and destination frames.

21. The memory device of claim 19, wherein the transition sequence is based on interpolation between the source frame and the destination frame.

22. The memory device of claim 19, wherein the transition sequence is based on inverse kinematics based on a definition of the character.

23. The method of claim 1, wherein the source and destination frames are selected arbitrarily by a user.

24. The method of claim 1, wherein transition sequences are updated automatically in response to a change in the first sequence or the second sequence or both.

25. The method of claim 1, wherein each of the first and second sequences of frames comprises an animation cycle.

26. The memory device of claim 10, wherein each of the first and second sequences of frames comprises an animation cycle.

27. The animation system of claim 11, wherein each of the first and second sequences of frames comprises an animation cycle.

28. The memory device of claim 19, wherein each of the first and second sequences of frames comprises an animation cycle.

29. A computer-implemented method for creating an animation transition sequence from a first cycle to at least one other cycle, each cycle comprising a plurality of frames, the method comprising:

permitting selection as a source frame an arbitrary one of the frames in the first cycle;

permitting selection as a destination frame an arbitrary one of the frames in another cycle; and automatically generating a transition sequence from the arbitrarily selected source frame to the arbitrarily selected destination frame.

30. A computer-implemented method for generating animation transitions between sequences of frames, the method comprising:

selecting three or more frames from among a first frame sequence and another frame sequence, the selected frames including at least one source frame in the first frame sequence and at least one destination frame in the other frame sequence; and automatically generating a transition between each source frame and each destination frame.

31. The method of claim 30, wherein the three or more frames are selected arbitrarily by a user.

32. The method of claim 30, wherein transition sequences are updated automatically in response to a change in the first sequence or the second sequence or both.

33. The method of claim 30, wherein automatically generating a transition between each source frame and each destination frame comprises generating a transition suite.

34. The method of claim 30, wherein each of the first and other sequences of frames comprises an animation cycle.

* * * * *